(12) United States Patent
Comay et al.

(10) Patent No.: US 10,530,764 B2
(45) Date of Patent: Jan. 7, 2020

(54) POST-CONNECTION CLIENT CERTIFICATE AUTHENTICATION

(71) Applicant: FORESCOUT TECHNOLOGIES, INC., San Jose, CA (US)

(72) Inventors: Oded Comay, Tel-Aviv (IL); Kevin Benjamin Mayer, Tel-Aviv (IL); Oren Nechushtan, Ramat-Gan (IL); Tomer Reisner, Rehovot (IL)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 256 days.

(21) Appl. No.: 15/383,230

(22) Filed: Dec. 19, 2016

(65) Prior Publication Data

US 2018/0176210 A1 Jun. 21, 2018

(51) Int. Cl.
H04L 29/06 (2006.01)

(52) U.S. Cl.
CPC ...... *H04L 63/0823* (2013.01); *H04L 63/0876* (2013.01); *H04L 63/101* (2013.01); *H04L 63/105* (2013.01); *H04L 63/20* (2013.01)

(58) Field of Classification Search
CPC ............. H04L 63/0823; H04L 63/0272; H04L 63/105; H04L 63/0876; H04L 63/101; H04L 63/20; H04W 12/06
See application file for complete search history.

(56) References Cited

U.S. PATENT DOCUMENTS

| 7,574,202 B1* | 8/2009 | Tsao .................... H04L 63/0272 455/411 |
| 2006/0168648 A1* | 7/2006 | Vank ....................... H04L 63/08 726/4 |
| 2011/0002341 A1* | 1/2011 | Damola ............. H04L 63/0823 370/401 |
| 2012/0002813 A1* | 1/2012 | Wei ..................... H04L 63/0272 380/270 |
| 2013/0091534 A1* | 4/2013 | Gilde .................. H04L 63/0227 726/1 |
| 2014/0165178 A1 | 6/2014 | Perrone et al. |
| 2017/0185793 A1* | 6/2017 | Rotem ................ G06F 21/6218 |

FOREIGN PATENT DOCUMENTS

| EP | 1841174 A1 * | 10/2007 | ............. G06F 21/31 |
| EP | 1841174 A1 | 10/2007 | |
| WO | 2009/133931 A1 | 9/2009 | |

OTHER PUBLICATIONS

PCT/US2017/063793, International Search Report and Written Opinion dated Feb. 27, 2018, 10 pages.

* cited by examiner

*Primary Examiner* — Nelson S. Giddins
(74) *Attorney, Agent, or Firm* — Womble Bond Dickinson (US) LLP; Daniel E. Ovanezian

(57) ABSTRACT

A network access control (NAC) device detects a connection of an endpoint device at a network switch coupled to a network and restricts access of the endpoint device to prevent the endpoint device from accessing resources of the network. The NAC device establishes a connection with the endpoint device, validates a client certificate corresponding to the endpoint device to authenticate the endpoint device as a corporate device and grants the endpoint device access to the resources of the network.

13 Claims, 5 Drawing Sheets

POST-CONNECTION CLIENT CERTIFICATE AUTHENTICATION

TECHNICAL FIELD

This disclosure relates to the field of network monitoring and, in particular, to post-connection client certificate authentication in a communication network.

BACKGROUND

As technology advances, the number and variety of devices that are connected to communication networks are rapidly increasing. Authentication of devices connected to a network can be useful for securing the communication network in order to prevent unauthorized or rogue devices from accessing network resources. Current authentication solutions are limited and narrow in their authentication abilities and are often time consuming processes that negatively affect the user experience. In addition, some current solutions are also cumbersome to configure and require precise configuration of many different network components.

BRIEF DESCRIPTION OF THE DRAWINGS

Aspects and embodiments of the present disclosure will be understood more fully from the detailed description given below and from the accompanying drawings. The present disclosure is illustrated by way of example, and not by way of limitation, in the figures of the accompanying drawings.

DETAILED DESCRIPTION

Figure 1:
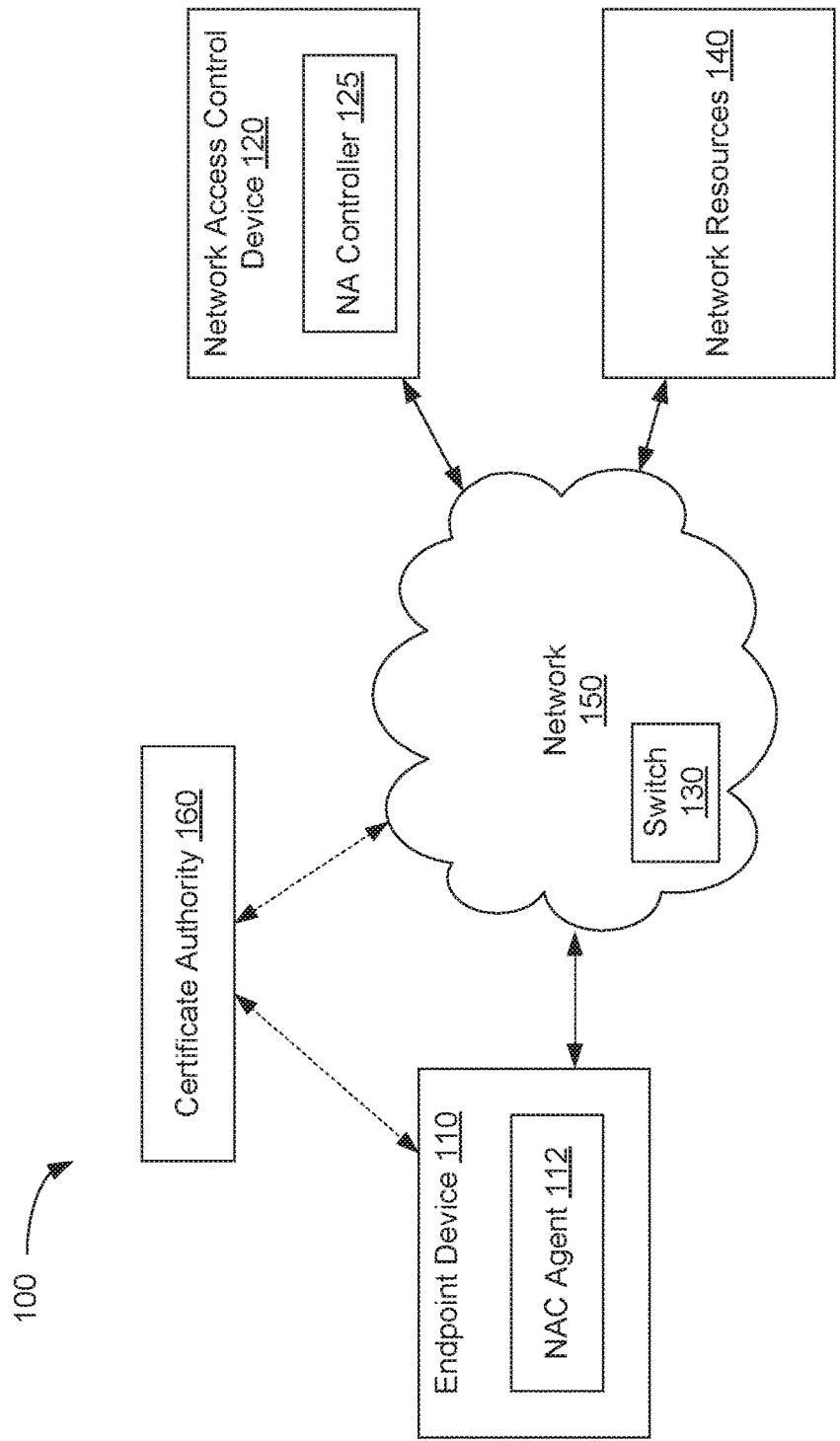
FIG. 1 is a block diagram illustrating an exemplary network architecture in which embodiments of the present disclosure may be implemented.

Embodiments are described for post-connection client certificate authentication in a communication network. In one embodiment, a network access control (NAC) device is aimed at controlling which network resources each device connecting to the communication network can and cannot access. This determination is typically made via an evaluation of conditions, such as determining whether the connecting device is a corporate endpoint or a rogue device, or determining whether the corporate endpoint is patched and has a valid anti-virus program installed, or not. These factors, and potentially many others, can then lead the NAC device to grant the connecting device a certain level of access to the network.

A common difficulty with NAC implementations, however, is that with tighter security controls, the longer it may take to evaluate what sort of network access the device should be granted. Consequently, in order to provide a smooth experience for the user of the connecting device, the connecting device may often be granted access to the network as a default behavior, and only have the access removed should the evaluations determine that the endpoint should not have been granted access. This smooth experience may come at the expense of security, however.

One method of providing a good user experience together with a high level of security is the 802.1x protocol which ensures connecting devices are authenticated using an X.509 digital certificate, or other credentials, prior to even gaining access to the network. The authentication process is comparatively fast, and a high level of security is maintained. There are, however, many complications with 802.1x implementation that prevent many organizations from deploying an 802.1x based network security system. One of the major drawbacks is the fail-closed nature of the protocol. In a fail-closed system, if the devices managing network access fail in any way (e.g., power outage, server crash), then all new connections to the network will be denied as a matter of policy until the network access control device comes back on-line. This is an acceptable security outcome but can severely damage the user experience.

The embodiments described herein provide an alternative to the pre-connect 802.1x protocol, using a post-connect paradigm. These embodiments utilize a working Public-Private Key Infrastructure with X.509 client certificates installed on connecting corporate endpoints. In one embodiment, a network switch or wireless controller (WLC) is configured such that when it detects a new connection to the communication network, it immediately applies an access control list (ACL) or wireless role to prevent the connecting device accessing any network resources except for the NAC device and potentially other resources, such as a dynamic host configuration protocol (DHCP) server, a domain name system (DNS) server, or other authentication server. A connection between the connecting device and the NAC device is immediately established. In one embodiment, a NAC agent on the connecting device sends a communication request to the NAC device to establish the connection. If the connecting device is agentless, the NAC device may monitor network activity to detect the presence of the connecting device and establish the connection.

In one embodiment, the connecting device provides a client certificate in order to authenticate itself to the NAC device. If the client certificate is validated (e.g., is issued by the corresponding organization, has not expired, has not been revoked, etc.), using, for example, an SSL handshake, the NAC device grants the connecting device network access to certain network resources except, optionally, the most sensitive parts of the network. Further evaluation of the connecting device may be conducted by the NAC device to determine whether the device meets the traditional requirements for network access, such as patch level and anti-virus. If the device passes this evaluation, then any sensitive network restrictions may be removed. If the endpoint fails evaluation, then network access is once again restricted, and the digital certificate is optionally revoked.

The embodiments described herein offer an acceptable level of security without negatively impacting the experience of users of devices connecting to the communication network. Corporate devices are able to be authenticated quickly and efficiently to grant access to network resources while unauthorized devices are prevented from gaining unsanctioned access. The network access control system is also configured for the implementation of a fail-open protocol. In a fail-open system, if the NAC device fails, then all new and pending connections to the network will be granted as a matter of policy until the NAC device comes back on-line. This prioritizes the user experience with the understanding that access can be revoked from any unauthorized devices at a later time.

FIG. 1 is a block diagram illustrating an exemplary network architecture in which implementations of the present disclosure may be implemented. The network architecture 100 can include one or more endpoint devices 110 communicating with network access control (NAC) device 120, and one or more other network resources 140 over one or more networks 150, according to one embodiment. Network 150 can be a local area network (LAN), a wireless network, a telephone network, a mobile communications network, a wide area network (WAN), such as the Internet, or similar communication system and in one embodiment, may include a network switch 130. Endpoint device 110, also referred to herein as a client device or computing device, may be any type of computing device including a server computer, gateway computer, desktop computer, laptop computer, mobile communications device, cell phone, smart phone, hand-held computer, tablet computer, set-top-box or similar computing device. Endpoint device 110 may be variously configured with different features to enable access to and use of the various network resources 140. Network resources 140 may include any resources accessible by endpoint device 110 over network 150, such as an email server, an Internet server, a media server, hardware devices, virtual machines, or any other resources.

In one embodiment, endpoint device 110 includes NAC agent 112. NAC agent 112 may be a hardware module, software module, or some combination thereof configured to gather information associated with endpoint device 110 and send that information to NAC device 120. The information can include the operating system and version, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), MAC address, processor utilization, unique identifiers, computer name, etc. NAC agent 112 may be configured to provide different levels and pieces of information based on device 110 and the information available to agent 112 from device 110. In one embodiment, NAC agent 112 may further be configured to establish a connection with NAC device 120 including sending a communication request upon connection of endpoint device 110 to network 150. In addition, NAC agent 112 may provide a client certificate to NAC device 120 in response to a request in order to authenticate endpoint device 110 and allow endpoint device 110 access to network resources 140. In one embodiment, the client certificate may be a X.509 client certificate provided by certificate authority 160. Certificate authority 160 may be connected to network 150 or may be accessible by endpoint device 110 through some other network connection.

In one embodiment, endpoint device 110 may connect to network 150 through switch 130, as switch 130 may be part of the infrastructure of network 150. In another embodiment, switch 130 may be separately connected to network 150 but may monitor and control the network communications of endpoint device 110. Switch 130 may include one or more network devices configured to facilitate communication among other network devices such as endpoint device 110, NAC device 120 and network resources 140. Depending on the embodiment, switch 130 may be referred to as an access control device and may include one or more network switches, access points, routers, firewalls, or hubs, a wireless controller, a virtual switch, etc.

NAC device 120 may be configured for a variety of tasks including monitoring and controlling access for devices, such as endpoint device 110, connected to network 150. NAC device 120 may be a computing system, network device (e.g., router, firewall, access point), intrusion prevention system (IPS), intrusion detection system (IDS), deception device, cloud-based device, virtual machine based system, etc. NAC device 120 may communicate with different network devices and security products to access information that may be used for authentication of devices coupled to network 150. NAC device 120 may be communicatively coupled to switch 130 in such a way as to receive network traffic flowing through switch 130 (e.g., port mirroring).

In one embodiment, NAC device 120 includes network access (NA) controller 125. NA controller 125 may be a hardware module, software module, or some combination thereof configured to implement the authorization protocol and determine what level of network access to grant to endpoint device 110. In one embodiment, NA controller 125 may communication with NAC agent 112 on endpoint device 110 and with switch 130 to control the network access. Additional details regarding the operation of NA controller 125 are described below with respect to FIGS. 2-4.

Figure 2:
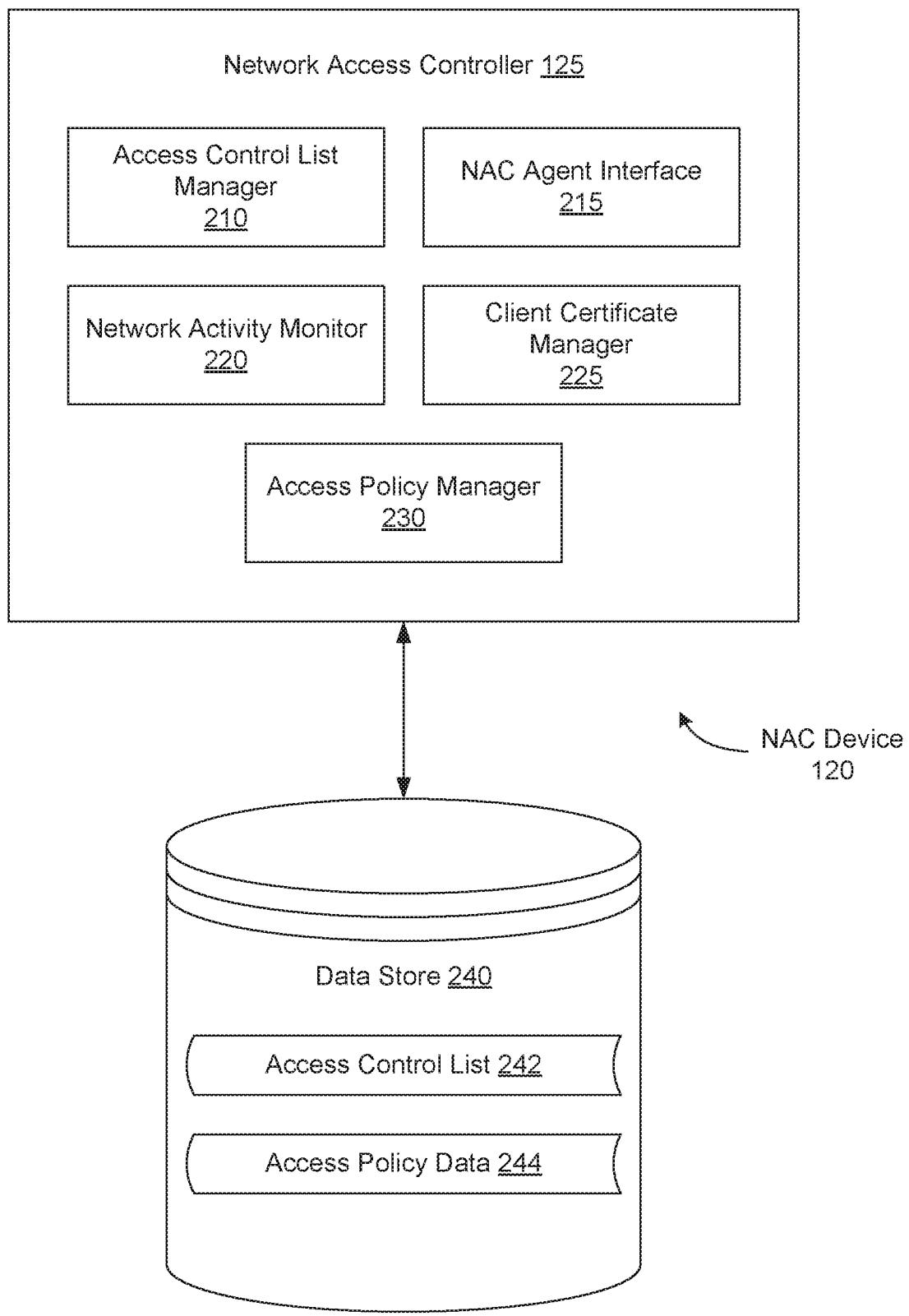
FIG. 2 is a block diagram illustrating a network access controller for post-connection client certificate authentication, according to an embodiment.

FIG. 2 is a block diagram illustrating a network access controller for post-connection client certificate authentication, according to an embodiment. In one embodiment, NA controller 125 includes access control list manager 210, NAC agent interface 215, network activity monitor 220, client certificate manager 225 and access policy manager 230. This arrangement of modules may be a logical separation, and in other embodiments, these modules or other components can be combined together or separated in further components. In one embodiment, NAC device 120 may include NA controller 125 and data store 240. In another embodiment, data store 240 may be external to NAC device 120 and may be connected to NAC device 120 over a network or other connection. In other embodiments, NAC device 120 may include different and/or additional components which are not shown to simplify the description. Data store 240 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, access control list manager 210 creates, manages and applies an access control list (ACL) 242 to switch 130 to control what network resources 140 a particular device (e.g., endpoint device 110) or group of devices has access to over network 150. In one embodiment the access control list 242 includes rules that are applied to port numbers or IP addresses that are available in network 150, each with a list of devices and/or networks permitted to use the corresponding resources or services. The access control list 242 can generally be configured to control both inbound and outbound traffic, similar to a firewall. In other embodiments, module 210 may implement other forms of access control, such as a virtual local area network (VLAN) assignment, virtual role, virtual firewall or other solution, that limits which resources in the network a particular device can access. In one embodiment, access control list manager 210 preconfigures switch 130 with an access control list 242, or a VLAN assignment, to be applied to any newly connected device, such as endpoint device 110. The preconfigured access control list 242 may cause switch 130 to restrict the access of endpoint device 110 to all of network resources 140. Initially, upon connection, the access control list 242 may grant endpoint device 110 access only to network access control device 120 until endpoint device 110 can be authenticated. Once endpoint device 110 is authenticated, access control list manager 210 may update the access control list 242 applied to switch 130 or apply a new access control list to switch 130 to grant endpoint device 110 access to more or all of network resources 140. The configuration described above thus represents a fail-open configuration. Since all ports on switch 130 are initially configured in an "open" mode, only being restricted when a new device is connected, if NAC device 120 suffers a failure, and is unable to restrict the ports, all new and pending connections to the network 150 will be granted as a matter of policy until NAC device 120 comes back on-line. In another embodiment, however, the system may have a fail-closed configuration. In this arrangement, all ports on switch 130 are configured in a "restrict" mode (even when nothing is connected to the port). Thus, if NAC device 120 is unable to open the ports open connection of a new device, all connection attempts will be denied.

In one embodiment, NAC agent interface 215 manages communication between NA controller 125 and NAC agent 112 on endpoint device 110. In one embodiment, NAC agent interface 215 receives a communication request from NAC agent 112 upon connection of endpoint device 110 to network 150. In addition, NAC agent interface 215 may receive a client certificate from NAC agent 112, which may be used to authenticate endpoint device 110 and determine whether endpoint device 110 is a corporate device. For example, NAC agent interface 215 may perform a client certificate handshake operation, such as a secure sockets layer (SSL) or transport layer security (TLS) handshake using a secured transmission control protocol (TCP) connection, to determine communication protocols, encryption information, exchange certificates, and authenticate endpoint device 110. In other embodiments, some other security token may be used, such as a symmetric key, asymmetric public/private key pair, etc.

In one embodiment, network activity monitor 220 monitors activity across network 150 or through switch 130 to detect the presence of newly connected devices. Certain endpoint devices may not be equipped with a NAC agent and thus, may not be configured to establish a connection with NAC device 120 to be authenticated. Network activity monitor 220 can monitor packets sent over network 150, read source and destination IP addresses, and compare those addresses with a list of known devices to determine whether a new device has been connected. In another embodiment, network activity monitor 220 may detect the presence of a device in some other fashion, such as by receiving traps from the switch 130. If a new device is detected that has not been authenticated, network activity monitor 220 can notify client certificate manager 225 so that the device can be authenticated.

In one embodiment, client certificate manager 225 receives the client certificate (e.g., an X.509 certificate), or some other verifiable identifier or token, and uses the certificate to authenticate the corresponding device, such as endpoint device 110. In one embodiment, the client certificate received from the endpoint device 110 may include a subject name, a client public key and a digital signature of the client public key, signed by a certificate authority 160. Client certificate manager 225 retrieves a certificate authority certificate comprising a certificate authority (CA) public key from the certificate authority 160 and uses the CA public key to verify the digital signature from the client certificate and to check whether the certificate has expired or been revoked. Once verified, client certificate manager 225 can verify the client subject name using the client public key and determine that the corresponding endpoint device 110 is authenticated and can notify access control list manager 210 to update the access permissions for endpoint device 110.

In one embodiment, access policy manager 230 performs an additional evaluation of an authenticated endpoint device 110 using access policy data 244 to determine an appropriate level of network access to be granted. Access policy data 244 may define a number of conditions to be evaluated, the results of which may affect which network resources 140 are accessible by the endpoint device. The conditions may correspond to information about the endpoint device including, for example, the operating system and version, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), MAC address, processor utilization, unique identifiers, computer name, etc. The conditions may also include a time and/or location of the connection request, a number of connection requests from the endpoint device, a user account associated with the endpoint device or other information.

Figure 3:
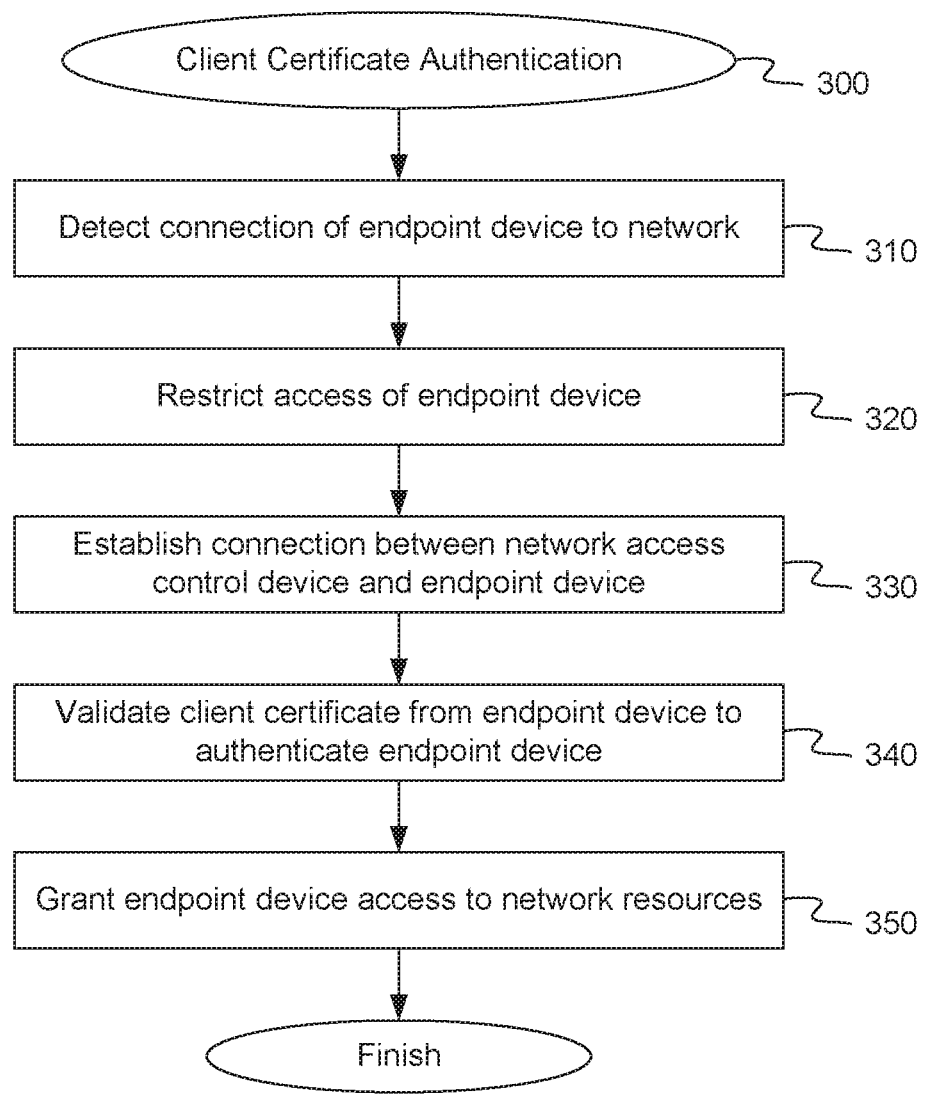
FIG. 3 is a flow diagram illustrating a method for post-connection client certificate authentication, according to an embodiment.

FIG. 3 is a flow diagram illustrating a method for post-connection client certificate authentication, according to an embodiment. The method 300 may be performed by processing logic that comprises hardware (e.g., circuitry, dedicated logic, programmable logic, microcode, etc.), software (e.g., instructions run on a processing device to perform hardware simulation), firmware or a combination thereof. The method 300 can be used to authenticate an endpoint device 110 connected to network 150 and determine a level of access to grant endpoint device 110 to network resources 140. In one embodiment, method 300 may be performed by NA controller 125, as shown in FIGS. 1 and 2.

Referring to FIG. 3, at block 310, method 300 detects a connection of an endpoint device 110 at a network switch 130 coupled to a network 150. At block 320, method 300 restricts access of the endpoint device 110 to prevent the endpoint device 110 from accessing resources 140 of the network. In one embodiment, access control list manager 210 preconfigures network switch 130 with an access control list 242 that restricts the access of endpoint device 110 to all of network resources 140. Initially, upon connection, the access control list 242 may grant endpoint device 110 access only to network access control device 120 until endpoint device 110 can be authenticated. This may prevent the endpoint device 110 from accessing any network resources 140 except for the NAC device 120. In another embodiment where the system uses a fail-closed configuration, all ports on switch 130 may be already configured in a "restrict" mode. Thus, endpoint device 110 would be restricted from accessing network resources 140 even before connecting to network 150. In one embodiment, the occurrence of the operations at block 310 is optional with respect to block 320, as block 320 may restrict access on a switch port regardless of whether or not an endpoint device was detected at block 310.

At block 330, method 300 establishes a connection between NAC device 120 and the endpoint device 110. If endpoint device 110 includes a NAC agent 112, NAC agent interface 215 may receive a communication request from NAC agent 112 upon connection of endpoint device 110 to network 150. NAC agent interface 215 may perform a secure sockets layer (SSL) or transport layer security (TLS) handshake to determine communication protocols, encryption information, exchange certificates, and authenticate endpoint device 110. If endpoint device 110 is not equipped with a NAC agent, network activity monitor 220 can monitor activity across network 150 or through switch 130 to detect the presence of endpoint device 110 and then establish a connection in order to authenticate endpoint device 110.

At block 340, method 300 validates a client certificate corresponding to the endpoint device 110 to authenticate the endpoint device 110 as a corporate device. In one embodiment, client certificate manager 225 receives the client certificate (e.g., an X.509 certificate) and uses the certificate to authenticate endpoint device 110. Additional details of the authentication process are described below with respect to FIG. 4.

At block 350, method 300 grants the endpoint device 110 access to the resources 140 of the network. Once verified, client certificate manager 225 can determine that the corresponding endpoint device 110 is authenticated and can notify access control list manager 210 to update the access permissions for endpoint device 110. Access control list manager 210 may update the access control list 242 applied to switch 130 or apply a new access control list to switch 130 to grant endpoint device 110 access to more or all of network resources 140. The resources to which access is granted may be defined by access policy manager 230. Access policy manager 230 performs an additional evaluation of an authenticated endpoint device 110 using access policy data 244 to determine an appropriate level of network access to be granted.

Figure 4:
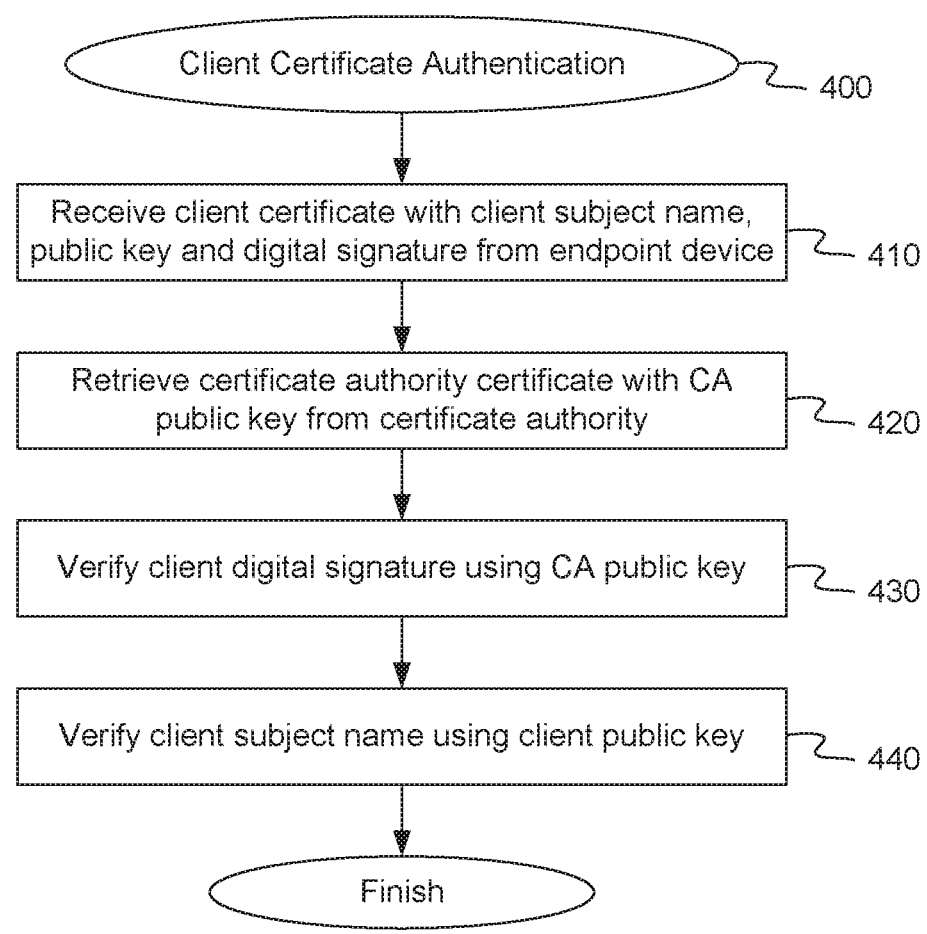
FIG. 4 is a flow diagram illustrating a method for post-connection client certificate authentication, according to an embodiment.

FIG. 4 is a flow diagram illustrating a method for post-connection client certificate authentication, according to an embodiment. The method 400 may be performed by processing logic that comprises hardware (e.g., circuitry, dedicated logic, programmable logic, microcode, etc.), software (e.g., instructions run on a processing device to perform hardware simulation), firmware or a combination thereof. The method 400 can be used to authenticate an endpoint device 110 connected to network 150 and determine a level of access to grant endpoint device 110 to network resources 140. In one embodiment, method 400 may be performed by NA controller 125, as shown in FIGS. 1 and 2.

Referring to FIG. 4, at block 410, method 400 receives the client certificate from the endpoint device 110, the client certificate comprising a subject name, a client public key and a digital signature of the client public key, signed by a certificate authority 160. In one embodiment, the client certificate includes a digital signature of some unique item. For example, in HTTPS, there could be a digital signature of a DNS name of the server. Verifying the digital signature ensures the client that the web server is authentic. Depending on the embodiment, the unique item could be the username of a user logged in to the endpoint device 110, or the hostname of the endpoint device 110. When an X.509 certificate is used, this unique item is referred to as "Subject Name." In other embodiments, a fingerprint of the certificate or a secret code stored in a registry may be used. At block 420, method 400 retrieves a certificate authority certificate from the certificate authority 160, the certificate authority certificate comprising a certificate authority (CA) public key. At block 430, method 400 verifies the digital signature of the client public key using the certificate authority public key. At block 440, method 400 verifies the client subject name using the client public key.

Figure 5:
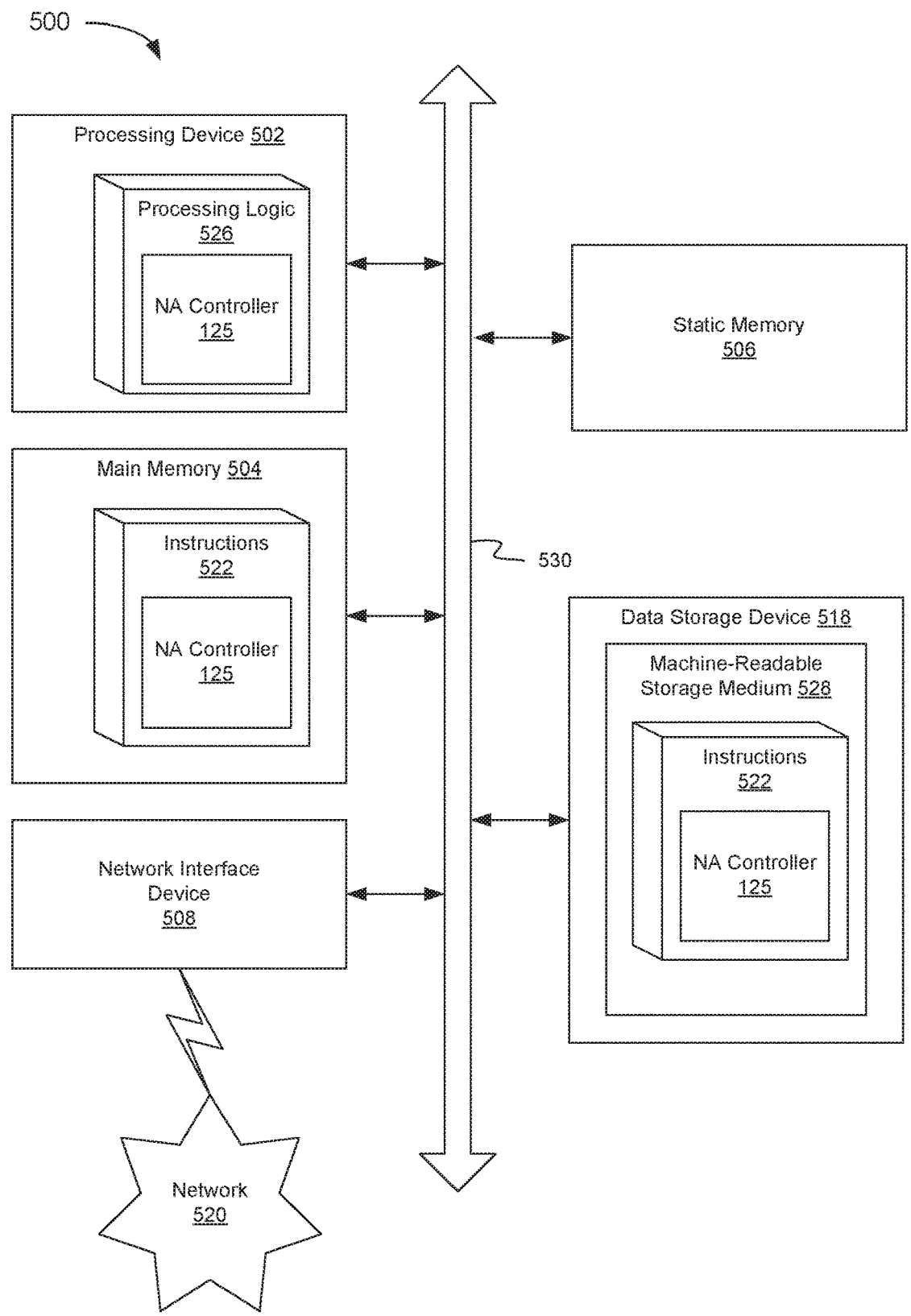
FIG. 5 is a block diagram illustrating an exemplary computer system on which embodiments of the present disclosure may be implemented.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as network access control device 120, as shown in FIGS. 1 and 2.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which includes NAC controller 125 as shown in FIG. 2, for performing the operations and steps discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute NAC controller 125. The instructions 522 may also reside, completely or at least partially, within the main memory 504 and/or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for client certificate authentication, as described herein. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A system comprising:
a memory; and
a processing device operatively coupled to the memory, the processing device to:
    detect a connection of an endpoint device at a network switch coupled to a network;
    restrict access of the endpoint device to prevent the endpoint device from accessing resources of the network by applying a VLAN assignment to the network switch;
    establish a connection with the endpoint device;
    validate a client certificate corresponding to the endpoint device to authenticate the endpoint device as a corporate device, wherein to validate the client certificate, the processing device to:
        receive the client certificate from the endpoint device, the client certificate comprising a subject name, a client public key and a digital signature of the client public key by a certificate authority;
        retrieve a certificate authority certificate from the certificate authority, the certificate authority certificate comprising a certificate public key;
        verify the digital signature of the client public key using the certificate authority public key; and
        verify the subject name using the client public key; and
    grant the endpoint device access to the resources of the network.

2. The system of claim 1, wherein to establish the connection with the endpoint device, the processing device to receive a communication request from a network access control agent on the endpoint device.

3. The system of claim 1, wherein to establish the connection with the endpoint device, the processing device to monitor network traffic through the switch and detect a presence of the endpoint device.

4. The system of claim 1, wherein to grant the endpoint device access to the resources of the network, the processing device to update an access control list for the switch based on characteristics of the endpoint device and access policy considerations of the network.

5. The system of claim 1, wherein the processing device further to:
not restrict access of the endpoint device to the resources of the network when a network access control device in the network suffers a failure during authentication of the endpoint device.

6. A method comprising:
detecting a connection of a client device to a network;
setting access permissions for the client device to restrict access to resources of the network;
establishing a connection between a network access control device and the client device, wherein establishing the connection between the network access control device and the client device comprises receiving a communication request from a network access control agent on the client device;
authenticating, by a processing device, the client device based on a client security token; and
updating the access permissions to grant the client device access to the resources of the network in response to the authenticating, wherein the security token comprises a client certificate and a client certificate handshake operation comprising:
receiving the client certificate from the client device, the client certificate comprising a subject name, a client public key and a digital signature of the client public key by a certificate authority;
retrieving a certificate authority certificate from the certificate authority, the certificate authority certificate comprising a certificate authority public key;
verifying the digital signature of the client public key using the certificate authority public key; and
verifying the subject name using the client public key.

7. The method of claim 6, wherein establishing the connection between the network access control device and the client device comprises monitoring network traffic through an access control device in the network and detecting a presence of the client device.

8. The method of claim 6, further comprising:
not restricting access of the client device to the resources of the network when the network access control device suffers a failure during authentication of the client device.

9. A non-transitory computer readable storage medium storing instructions, which when executed, cause a processing device to:
upon connection of a computing device to a network, prevent the computing device from accessing any resources of the network except a network access control device by applying a virtual firewall to a switch in the network;
establish a connection between the network access control device and the computing device;
determine, by the processing device, whether the computing device is an authorized computing device, wherein to determine whether the computing device is an authorized computing device, the processing device to:
receive a client certificate from the computing device, the client certificate comprising a subject name, a client public key and a digital signature of the client public key by a certificate authority;
retrieve a certificate authority certificate from the certificate authority, the certificate authority certificate comprising a certificate authority public key;
verify the digital signature of the client public key using the certificate authority public key; and
verify the subject name using the client public key; and
when the computing device is an authorized computing device, allow the computing device to access additional resources of the network.

10. The non-transitory computer readable storage medium of claim 9, wherein to establish the connection between the network access control device and the computing device, the processing device to receive a communication request from a network access control agent on the computing device.

11. The non-transitory computer readable storage medium of claim 9, wherein to establish the connection between the network access control device and the computing device, the processing device to monitor network traffic through a switch in the network and detect a presence of the computing device.

12. The non-transitory computer readable storage medium of claim 9, wherein to allow the computing device to access additional resources of the network, the processing device to update an access control list for the switch based on characteristics of the computing device and access policy considerations of the network.

13. The non-transitory computer readable storage medium of claim 9, wherein instructions further cause the processing device to:
not restrict access of the computing device to the resources of the network when the network access control suffers a failure during authentication of the computing device.

* * * * *